(12) United States Patent
Collins et al.

(10) Patent No.: US 11,322,787 B2
(45) Date of Patent: May 3, 2022

(54) ENCAPSULATING IN-SITU ENERGY STORAGE DEVICE WITH CATHODE CONTACT

(71) Applicant: International Business Machines Corporation, Armonk, NY (US)

(72) Inventors: John Collins, Tarrytown, NY (US); John M. Papalia, New York, NY (US); Devendra K. Sadana, Pleasantville, NY (US); Matthew Sagianis, Bayside, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 16/687,607

(22) Filed: Nov. 18, 2019

(65) Prior Publication Data

US 2021/0151719 A1    May 20, 2021

(51) Int. Cl.
*H01M 6/40*     (2006.01)
*H01M 50/10*    (2021.01)
(Continued)

(52) U.S. Cl.
CPC .......... *H01M 50/10* (2021.01); *H01M 10/02* (2013.01); *H01M 10/0436* (2013.01);
(Continued)

(58) Field of Classification Search
CPC .. H01M 50/10; H01M 10/02; H01M 10/0436; H01M 10/052; H01M 10/0565;
(Continued)

(56) References Cited

U.S. PATENT DOCUMENTS 6,900,114 B2   5/2005   Ohmi et al.
6,916,679 B2   7/2005   Snyder et al.
(Continued)

FOREIGN PATENT DOCUMENTS

WO   WO2011156419 A2   12/2011
WO   WO2017/093074     11/2016
(Continued)

OTHER PUBLICATIONS

U.S. Appl. No. 17/366,521, filed Jul. 2, 2021 and any related art cited in this Application.
(Continued)

*Primary Examiner* — Jane J Rhee
(74) *Attorney, Agent, or Firm* — Daniel P. Morris; Randall Bluestone; Lou Percello, Attorney, PLLC

(57) ABSTRACT

An energy storage device has all components, e.g. anode, electrolyte, and cathode contained and sealed with a trench in a substrate. Various methods and structures are disclosed for sealing the components. In some embodiments, a sealer or sealing layer seals the components. One embodiment uses a tension clamp to contain the components with additional pressure. Another embodiment uses a cathode structure cup which is held in place in the substrate via sidewall trench features. Different external connections to the device are disclosed. The invention enables full three-dimensional components to be created and contained entirely within the substrate during assembly, curing, galvanic cycling and other manufacturing processes and provides improved sealing of the components during device operation.

20 Claims, 15 Drawing Sheets

(51) Int. Cl.
  *H01M 10/052* (2010.01)
  *H01M 10/04* (2006.01)
  *H01M 10/02* (2006.01)
  *H01M 10/0565* (2010.01)
  *H01M 10/0585* (2010.01)

(52) U.S. Cl.
  CPC ..... *H01M 10/052* (2013.01); *H01M 10/0565* (2013.01); *H01M 10/0585* (2013.01); *H01M 2220/30* (2013.01); *H01M 2300/0082* (2013.01); *H01M 2300/0094* (2013.01)

(58) Field of Classification Search
  CPC ......... H01M 10/0585; H01M 2220/30; H01M 2300/0082; H01M 2300/0094
  See application file for complete search history.

(56) References Cited

U.S. PATENT DOCUMENTS

| | | |
|---|---|---|
| 7,368,332 B2 | 5/2008 | Moriwaki et al. |
| 8,420,252 B2 | 4/2013 | Shakespeare et al. |
| 8,889,295 B2 | 11/2014 | Yushin et al. |
| 8,911,897 B2 | 12/2014 | Bedjaoui et al. |
| 9,142,833 B2 | 9/2015 | Tolbert et al. |
| 10,581,109 B2 | 3/2020 | de Souza et al. |
| 10,644,356 B2 | 5/2020 | de Souza et al. |
| 10,777,842 B2 | 9/2020 | de Souza et al. |
| 2002/0071989 A1 | 6/2002 | Verma et al. |
| 2010/0291431 A1 | 11/2010 | Shih et al. |
| 2015/0102530 A1 | 4/2015 | Wallace et al. |
| 2015/0194697 A1 | 7/2015 | Hung et al. |
| 2017/0098823 A1 | 4/2017 | Yushin et al. |
| 2017/0162911 A1 | 6/2017 | Gaben |
| 2018/0269525 A1 | 9/2018 | Hur et al. |
| 2019/0115625 A1 | 4/2019 | Sadana et al. |
| 2019/0214082 A1 | 7/2019 | Li et al. |
| 2020/0014058 A1 | 1/2020 | de Souza et al. |
| 2020/0014059 A1 | 1/2020 | de Souza et al. |
| 2020/0014060 A1 | 1/2020 | de Souza et al. |
| 2020/0020895 A1 | 1/2020 | Collins et al. |
| 2020/0212492 A1 | 7/2020 | Collins et al. |
| 2020/0335826 A1 | 10/2020 | Collins et al. |
| 2020/0014018 A1 | 11/2020 | de Souza et al. |
| 2020/0395628 A1 | 12/2020 | Collins et al. |
| 2020/0403190 A1 | 12/2020 | Collins et al. |
| 2021/0265606 A1 | 8/2021 | Dang et al. |
| 2021/0399275 A1 | 12/2021 | Collins et al. |
| 2021/0399346 A1 | 12/2021 | Collins et al. |

FOREIGN PATENT DOCUMENTS

| | | |
|---|---|---|
| WO | WO2019077426 A1 | 4/2019 |
| WO | WO2020008285 A1 | 1/2020 |

OTHER PUBLICATIONS

U.S. Appl. No. 16/994,813, filed Aug. 17, 2020 and any related art cited in this Application.

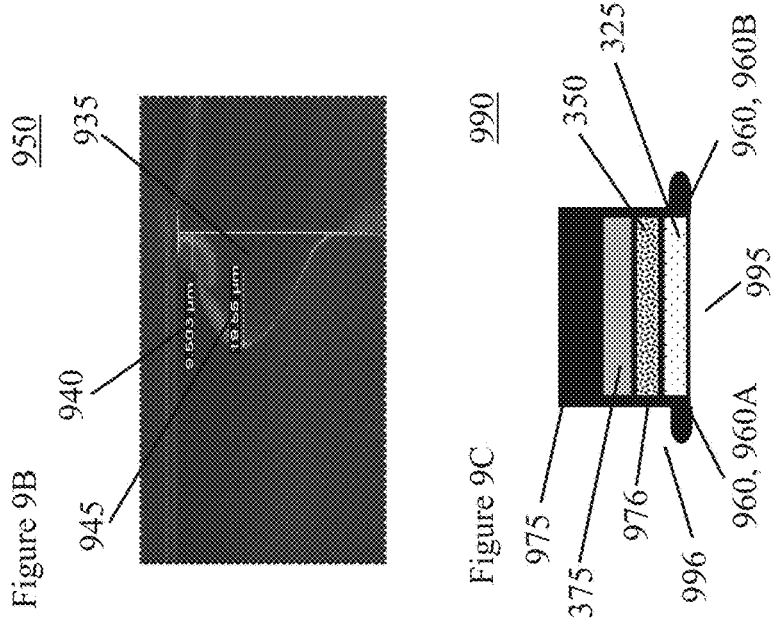
Figure 9B
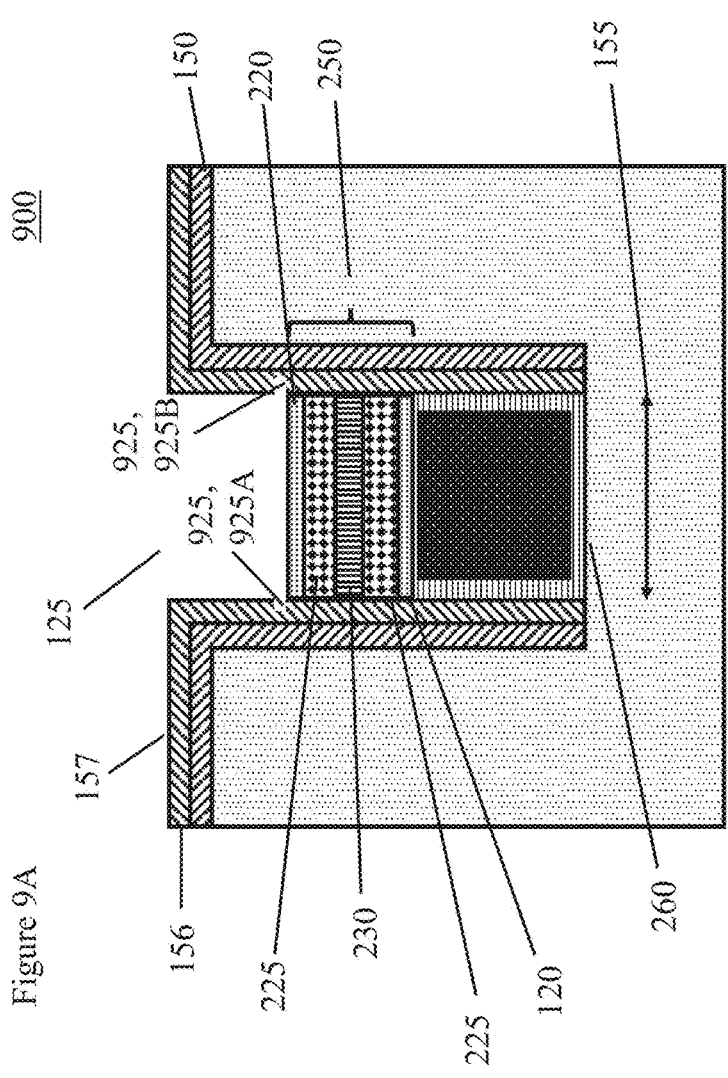
Figure 9A
Figure 9C

ENCAPSULATING IN-SITU ENERGY STORAGE DEVICE WITH CATHODE CONTACT

BACKGROUND

The present invention relates to encapsulating in-situ energy storage devices. More specifically the invention related to encapsulating in-situ lithium batteries with various cathode contacts.

In-situ energy storage devices are energy storage devices in which high functioning active layers are enabled by inducing electrochemical charge mobility in the device via alteration of the active layer chemistry. Ex-situ energy storage devices are energy storage devices which are fully electrochemically enabled upon fabrication of the full cell.

The integration of energy storage devices, e.g. batteries, in microprocessor and memory chips is a significant requirement for the IoT (Internet of Things) devices and other applications. In addition to IoT applications, emerging applications requiring these on-board next generation energy storage devices include mobile devices; sensory equipment; and autonomous environmental, biological, and social functioning machines. Common examples of such functional devices are smart dust and/or biomedical sensory/medicine-delivery devices.

Over the next generation, as human controlled and autonomous devices increasingly become miniaturized, total energy consumption requirements for electronic devices will decrease. Power consumption is expected to be lower than 1 Watt for these devices. However, because of device miniaturization, the energy storage devices providing device power will need to be miniaturized as well, sometimes be embedded in CMOS circuits, and will need high energy and power density.

Additionally, solid-state energy storage devices will progressively integrate lithium metal or silicon or lithium-silicon composite electrode material into its overall cell structure due to the electrode's extremely high theoretical specific capacity ($\geq 3860$ mAh/g). Lithium metal is highly reactive and there is a need for good encapsulation of these miniaturized devices to prevent device internals from leaking and to prevent external contaminants from entering the device. In addition, the device encapsulation must allow for electrical connection to outside circuitry, ideally in a gravimetric and spatially efficient manner. It is desirable that device encapsulation is performed using standard manufacturing techniques.

Three-dimensional encapsulation and sealing materials need to fit together with other 3-dimensional (3D) device components in a complimentary fashion to enable higher full energy storage device performance of integrated, 3D energy storage devices providing high energy and power density. For example, 3D cathode active material needs to connect to a sealing current collector attached to or integrate into a 3D anode material with its own integrated current collector within a hermetically sealed architecture. Failure to achieve proper integration and connection is observed to reduce the device's energy capacity, energy density, and/or rate or power capabilities, when compared with 2D analogs of the respective device.

SUMMARY

Embodiments of an energy storage device are disclosed along with methods of making the device. The device comprises a substrate with one or more trenches, each with a trench bottom and (typically four) trench sidewalls. One or more electrically insulating layers/liners line the trench sidewalls, cover the top of the substrate, and define the upper regions of the trench. No insulating liner material is on the trench bottom. The following components are disposed entirely within the three-dimensional active region defined by the trench bottom, trench sidewalls, and insulating liners: an anode, an electrolyte in contact with the anode, and a cathode structure in contact with the electrolyte. The electrolyte and cathode can be made of different sublayers. Various methods and structures are disclosed for sealing the components, e.g. the anode, electrolyte, and cathode structure, within the trench/active region. In some embodiments, a sealer or sealing layer seals the components. One embodiment uses a tension clamp to contain the components with additional pressure. Another embodiment uses a cathode structure cup. Different external connections to the device are disclosed, some which also contain the components. The invention enables full three-dimensional components to be created and contained entirely within the substrate during assembly, curing, galvanic cycling, and other manufacturing processes and provides improved sealing of the components during device operation.

BRIEF DESCRIPTION OF THE DRAWINGS

FIG. 9A is a cross section elevation of another alternative embodiment of a preliminary energy storage structure with an electrolyte layer placed in the active region and notches in the sidewalls of the active region above the electrolyte layer.

FIG. 9B is a micrograph image of the notches in the sidewalls of the active region.

FIG. 9C is a cross section elevation of a cathode structure cup with non-conductive knob components to enable a lock-and-key style connection between the cathode cup and substrate notches.

DETAILED DESCRIPTION

Figure 1:
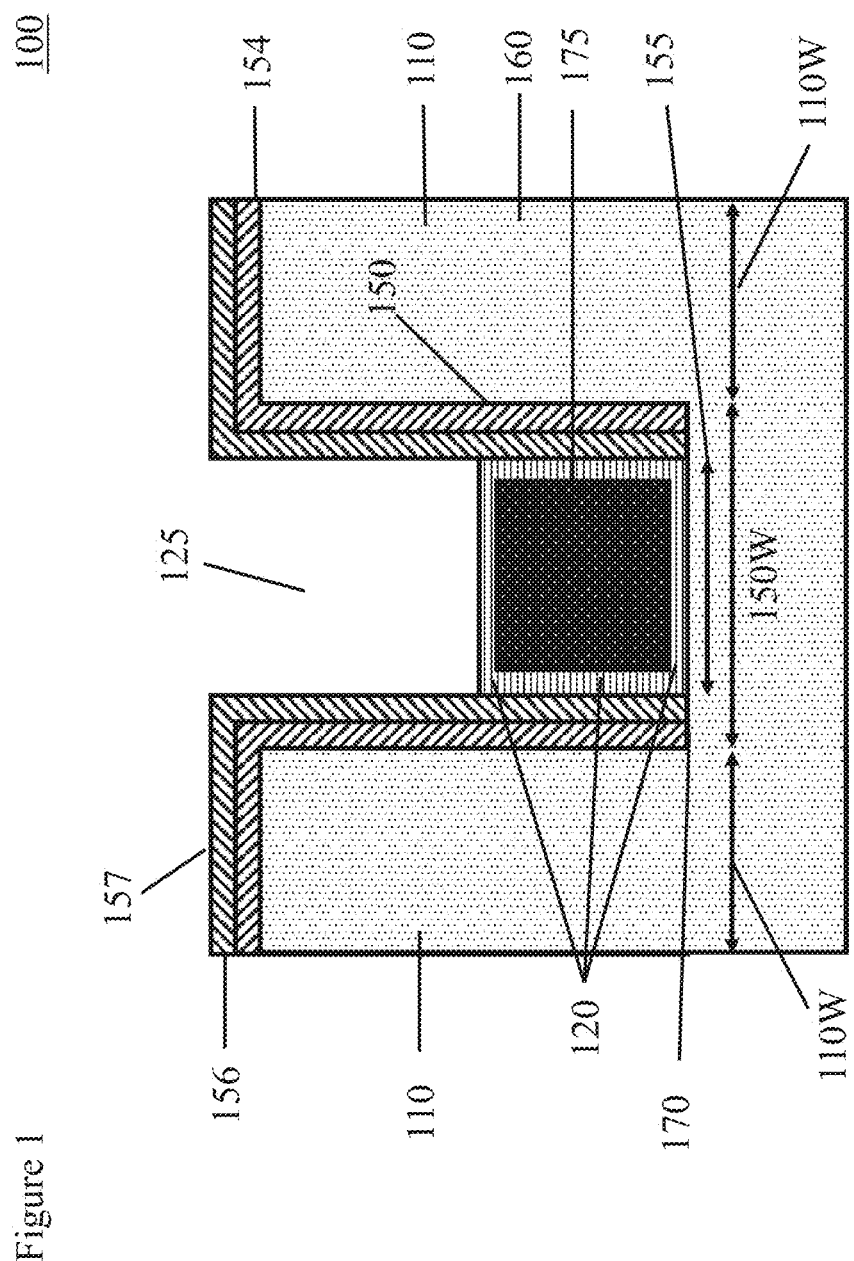
FIG. 1 is a cross section elevation of a preliminary energy storage device in-situ structure with one embodiment of an anode layer placed on the trench base, the anode layer and trench base both within an active region in the trench.

It is to be understood that the various layers and/or regions shown in the accompanying drawings are not drawn to scale. Omission of commonly used layer, materials, or regions does not imply that the layers and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings.

As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin", or derivatives thereof may be used in place of "height" where indicated.

As used herein, "lateral," "lateral side," "side," and "lateral surface" refer to a side surface of an element (e.g., a layer, opening, etc.), such as a left or right-side surface in the drawings. Lateral also means traversing from side to side, e.g. moving along the length of a channel from a source side to a drain side.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element.

As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that these terms might be affected by the orientation of the device described. For example, while the meaning of these descriptions might change if the device was rotated upside down, the descriptions remain valid because they describe relative relationships between features of the invention.

Refer now to Figures.

FIG. 1 is a cross section elevation of a preliminary energy storage device in-situ structure 100.

The structure begins with a substrate 160 made of Silicon (Si). One or more trenches 150 are etch out of the substrate 160 using known techniques. The trench 150 has a trench width 150W. The substrate can be made of undoped, crystalline Si or highly doped Si. Both materials are conductive.

In some embodiments, the trench width 150W is between 0.96 and 1.03 millimeters (mm) wide. In some embodiments, the trench has a depth (into the Figure, not shown) equal to the trench width 150W producing a trench bottom 170 nominally 1 mm$^2$. Other dimensions of the trench 150 are envisioned, particularly for energy storage devices that are scaled to larger sizes. Other shapes of the trench bottom 170 are also envisioned.

The substrate regions bordering the sides of the trench are sidewalls 110 of the trench 150 (trench sidewalls 110). The sidewalls 110 have a sidewall thickness 110W of about 2 mm. In some embodiments, the sidewall thickness 110W is determined by the dimensions of the structure 100 if singulated from the substrate 160 (wafer) or by the pitch dimension of other energy storage structures 100 adjacent on a larger substrate 160. Other sidewall thicknesses 110W are envisioned.

The trench 150 has a trench bottom 170.

A first 154 and optionally a second 156 insulating layer (also called and insulating liner—154, 156) are conformally deposited on the structure 100 to cover the sides of the trench, the trench bottom 170, and the top surface of the substrate 160. The insulating layers/liners (154, 156) are made of an electrically insulating, dielectric material. In some embodiments, the insulating layers/liners (154, 156) are made of Silicon Dioxide (SiO2) or Silicon Nitride (SiN). The insulating layers/liners (154, 156) are between 200 nanometers (nm) and 1000 nm thick. Other thicknesses are envisioned.

In some embodiments, a directional etch, e.g. a reactive ion etch (RIE), is performed to remove the insulating layers/liners (154, 156) from the trench bottom 170 between the insulating layers/liners (154, 156) deposited on the side walls 110 of the trench 150. Removing the insulating layers/ liners (154, 156) from the trench bottom 170 exposes the surface of the substrate 160 on the trench bottom 170 within an active region 125 of the trench 150 below the anode 175. The exposed surface of the trench bottom 170 of the substrate 160 later forms an active surface 260 (shown below in FIG. 2) between the substrate 160 and the internal components of the energy storage structure 100, e.g. the anode 175 etc., deposited in the active region 125.

The active region 125 is within the trench 150 between the insulating layers/liners 154, 156) and extending from the trench bottom 170 to the top of the top-most insulating layer 157. In some embodiments, all the internal components of the energy storage structure 100 are retained in the active region 125.

The active surface 260 has an active surface 260 width 155 which in some embodiments is on the order of 1 mm. In some embodiments, the active surface 260 width 155 is also the width of the active region 125. Other dimensions of the active surface width 155 are envisioned, particularly for energy storage devices, e.g. batteries, that are scaled up in size.

Precursor materials are put within the active region 125 as the energy storage device, e.g. battery, is formed.

In some embodiments, a conductive adhesive layer 120 is optionally deposited in the bottom of the active region 125 of the trench 150 before the anode 175 material is deposited. In some embodiments, the adhesive layer is a polymer that chemically and physically adheres to the active surface 260 of the substrate 160 and anode 175. In some embodiments the conductive adhesive layer 120 is Polyaniline (PANI) or PANI with a lithium conductive salt, e.g., Lithium bis(trifluoromethanesulfonyl)imide (LiTFSI). The conductive adhesive layer 120 may initially be deposited on the substrate 160 active surface 260 and, during operation of the device, the conductive adhesive layer 120 migrates around, throughout, and over the anode 175 and over the active surface 260.

The anode 175 can be any known conductive and charge storage host material used for these purposes, e.g. graphite.

Figure 2:
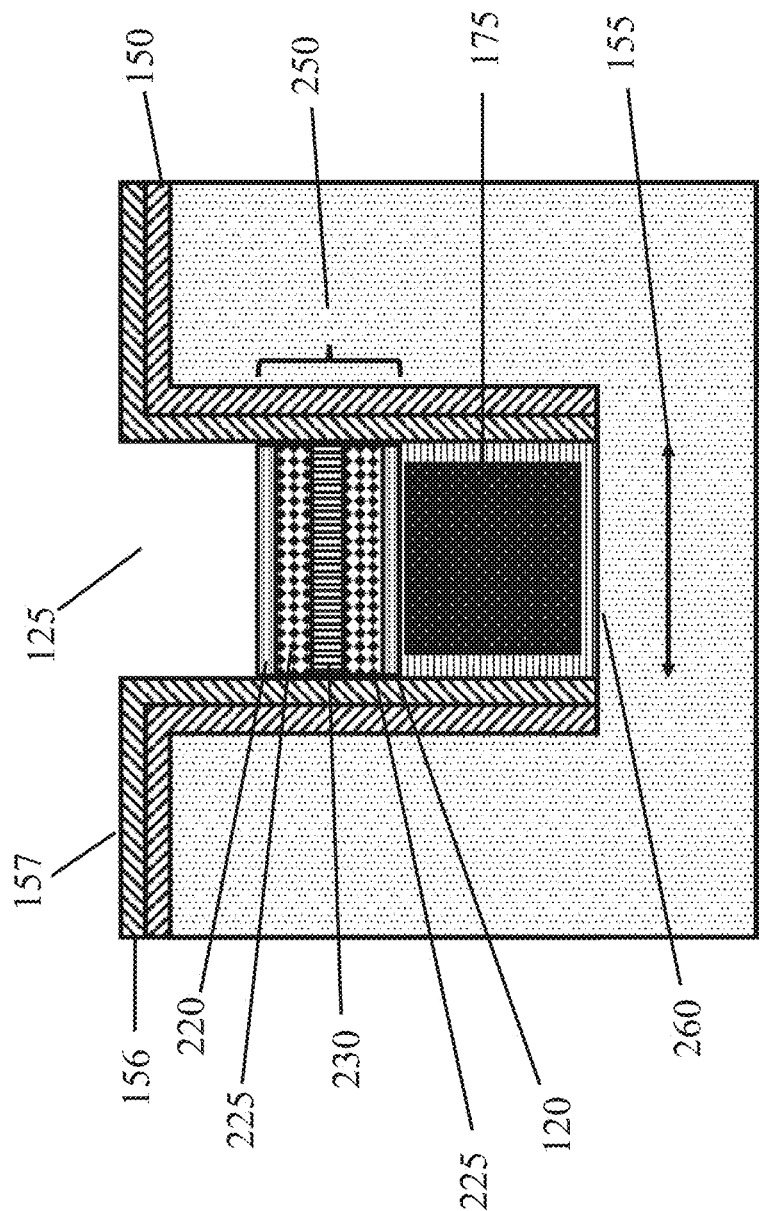
FIG. 2 is a cross section elevation of a preliminary energy storage structure with one embodiment of an electrolyte layer placed on an anode, the electrolyte layer and anode both within an active region in the trench.

FIG. 2 is a cross section elevation of a preliminary energy storage device in-situ structure 200 with one embodiment of an electrolyte layer 250 placed in an active region 125.

The electrolyte layer 250 deposited on the anode 175. In some embodiments, this layer can be made of any electrolytic material used in the art, e.g. a polymer electrolyte. In other embodiments, a solid polymer electrolyte (SPE) is used. An example material for the SPE is a composition using a separator material (e.g. a fabric-like inter-woven layer material like polyacrylnitrile, PAN) saturated in polymers like polycaprolactone (PCl) and succinonitrile (SN) and a lithium containing salt like Lithium bis(trifluoromethanesulfonyl)imide (LiTFSI).

It is noted that in some embodiments, while these materials are deposited in the active region 125 in a particular form, after the initial battery structure is completed and the battery is encapsulated, preliminary and regular operation of the device cause physical, chemical, and electrical transformations of these regions and materials that change the characteristics of the device. For example, during galvanic cycling, in some embodiments, the active surface 260 of the device is transformed so that the active surface 260 is no longer a flat uniform surface of the substrate 160. In other embodiments the active surface 260 may be 3 dimensionally textured via chemical and/or physical treatments, where upon galvanic cycling, the surface may be altered in its dimensionality and shape. Other transformations also occur.

Galvanic cycling is a process where initially current is forced through the battery (galvanostatic cell cycling) between a lower and a higher cell voltage as well as between a lower and higher applied current. During this cycling operation, the precursor materials change due to migration of lithium ions, electrons, and materials through the structures of the device to physically, chemically, and electrically change the precursor materials within the active region 125.

Since these changes occur within the active region 125 within the trench 150, the final energy storage device/battery is formed in-situ within the trench.

Due to the trench 150 structure, fluid materials like slurries can be used to deposit materials in the active region 125 by standard techniques, e.g. doctor blading. Internal components can be much thicker than film type materials used in 2 dimensional and 2.5 dimensional batteries of the prior art because the precursor materials are contained within the trench 150 during deposition, curing, and other physical and chemical transformations of the precursor materials.

Figure 3:
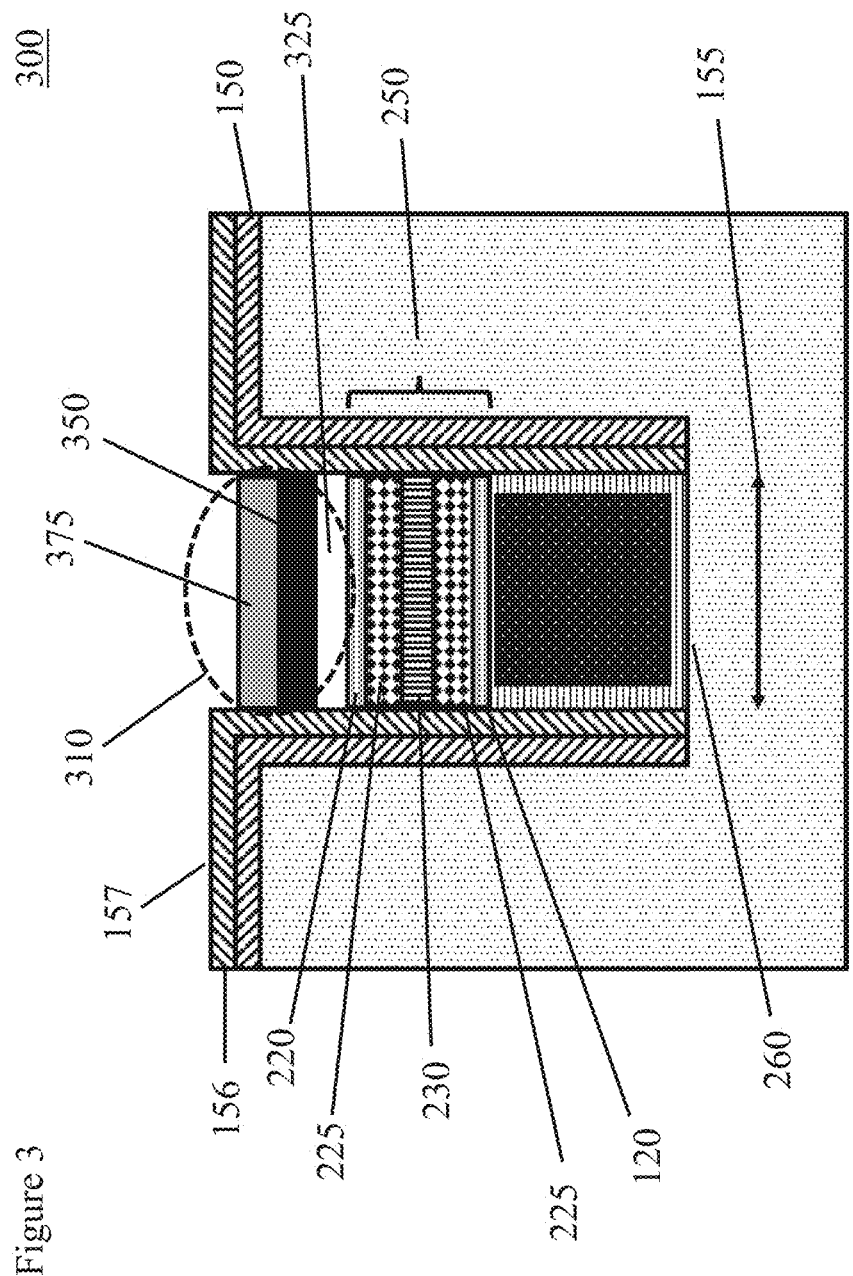
FIG. 3 is a cross section elevation of an energy storage/battery structure with one embodiment of the cathode structure in place on the electrolyte layer in the active region in the trench.

FIG. 3 is a cross section of an elevation of a preliminary energy storage structure 300 with one embodiment of a cathode structure 310 in place in the active region 125.

The cathode structure 310 has cathode structure width (and depth, not shown) the same as the active surface width 155 so the cathode structure 310 fits within the active region 125 and forms a partial seal to keep the electrolyte 250 and anode 175 encapsulated in the active region 125.

In preferred embodiments, the cathode structure 310 is made of layers including a dielectric separator 325, a cathode/electrode 350, and a conductive cap 375.

In some embodiments, the dielectric separator 325 electrically isolates the cathode 350 from the electrolyte. In some embodiments, the dielectric separator 325 prevents the flow of electrons but permits ionic current, e.g. the flow of lithium ions.

Any known dielectric separator 325 material can be used. However, in some embodiments, the dielectric separator 325 is a woven fabric-like polymer material, like Polyaniline (PAN), which is not conductive to electrons. The dielectric separator 325 is between 10 microns and 100 microns thick but other thicknesses are contemplated.

The conductive cap 375 layer can be made of any conductive material like metal, and preferably a metal which does not undergo irreversible chemical change or corrosion during electrochemical cycling of the cell. In some embodiments, the conductive cap 375 is a metallic foil made of any metal like Aluminum (Al) or Nickel (Ni). The conductive cap 375 has a range of thickness between 50 microns and 200 microns although other thicknesses are contemplated. The conductive cap 375 can be deposited by standard techniques like physical vapor deposition (PVD) and atomic layer deposition (ALD), etc. The conductive cap can also be a preformed independent material which is physically placed in contact with the material in the active trench and sealed mechanically. The conductive cap 375 is in electrical and physical contact with the cathode 350.

The cathode 350 can be made of any known cathodic material. The cathode 350 is between 10 microns and 300 microns thick although other thicknesses are contemplated. The thicker cathode 350 enables a higher charge storage capacity.

In some embodiments, the cathode 350 is made of Lithium Manganese Oxyfluoride (LMOF), $Li_2MnO_2F$, or Lithium Iron Phosphate (LFP), $LiFePO_4$, in combination with a solid polymer electrolyte (SPE) material, conductive additives, and binders.

This composition of matter used as a cathode 350 has a low material impedance, a low in circuit impedance, and good electrical characteristics when formulated with a SPE as a component of the cathode recipe. The use of SPE in the formulation also enhances good adhesion to device components which lowers interfacial impedance of the working device as a whole. The LMOF cathode composition has a higher concentration of lithium (two lithium atoms per molecule) and therefore enables a higher device voltage at a given current and a higher current capacity.

In some embodiments, LMOF makes up between 55 percent and 85 percent by mass of the total cathode 350 and the SPE material makes up between 7.5 percent and 20 percent by mass of the total cathode 350. When added, a conductive additive, like carbon black, makes up between 5 percent and 15 percent by mass of the cathode 350. In some embodiments, binders can make up 4 to 10 percent by mass of the cathode 350.

After the cathode structure 310 is made, the cathode structure 310 is deposited/placed in the active region 125. The placement can be performed by known pick and place processes. In some manufacturing environments, multiple cathode structures are each placed each in an active region 125 of one of multiple trenches 150 on a substrate 160. In alternative embodiments, the cathode structure 310 is made by individually layering one or more of the dielectric separator 325, cathode 350, and conductive cap 375 layers.

Figure 4:
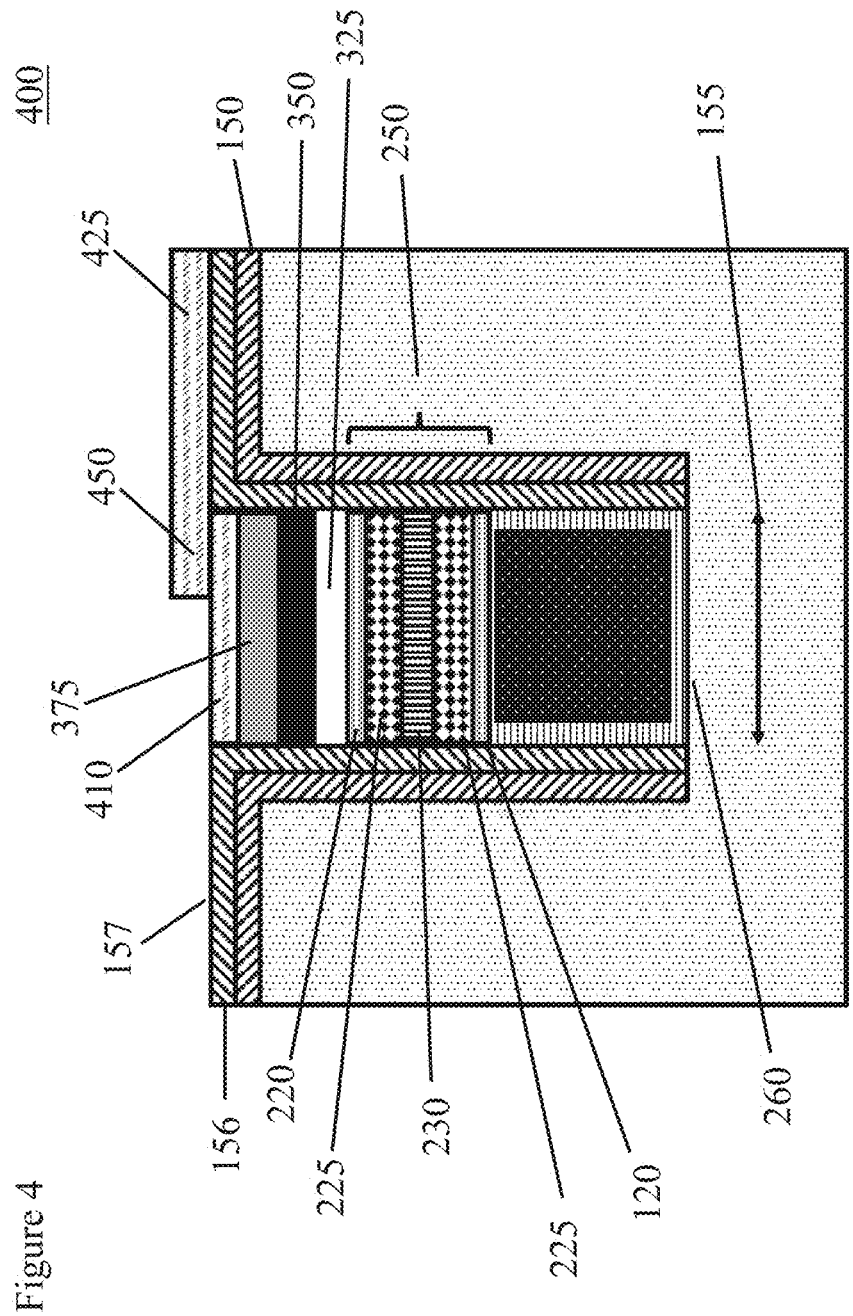
FIG. 4 is a cross section elevation of one embodiment of a preliminary energy storage structure after the active region and trench are sealed with a sealing layer, the structure surface is planarized, and the active region is partially covered with an insulating layer.

FIG. 4 is a cross section elevation of one embodiment of a preliminary energy storage structure 400 after the active region 125 is sealed with a sealing layer 410, the surface 157 is planarized, and the active region 125 is partially 450 covered with an insulating layer 425.

The sealing layer 410 can be any electrically conductive layer that can seal the active region 125 so that components internal to the active region 125 do not leak out and so external contaminants do not enter the active region 125.

In some embodiments, the sealing layer 410 is a conductive epoxy like silver (Ag) epoxy. The epoxy may need to cure at a low temperature around 60 degrees Celsius.

The sealing layer 410 finishes the sealing and filling of the active region 125. The structure 400 is then planarized, e.g. with a chemical mechanical polishing (CMP), blading techniques, etc. until the top 157 is flat and coplanar with the top of the sealing layer 410. The sealing layer 410 permits electrical connection from external circuitry to the cathode conductive cap layer 375 to the cathode 350 and therefore to the other internals of the energy storage/battery 400.

An electrically insulating layer 425 is then deposited using known masking and deposition techniques to partially 450 cover the top surface 157 of the structure 400. In some embodiments, part of the conductive top of the sealing layer 410 in the active region 125 is overlapped 450 with the insulating layer 425.

The insulating layer 425 materials include silicon dioxide (SiO2), silicon nitride (SiN), non-conductive polymers, etc. and the thickness of the insulating layer 425 is between 50 microns and >1000 microns. The insulating layer 425 is deposited using known techniques.

In these embodiments, all the battery components, including the anode 175, electrolyte 250, cathode structure 310, and all associated and developed structures are manufactured, contained, chemically and physically changed, and sealed within the active region 125.

Figure 5B:
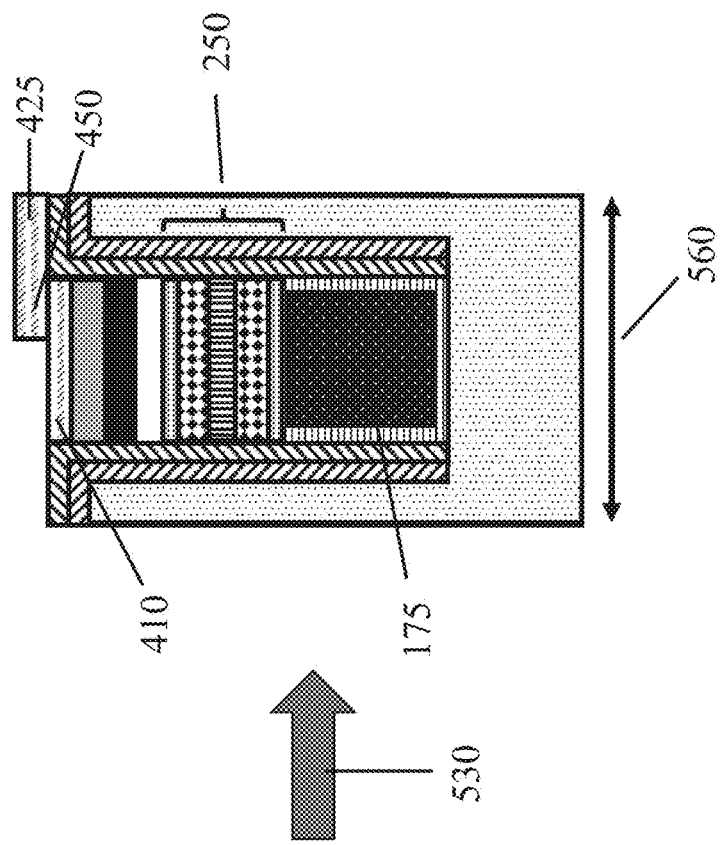
FIG. 5B is a cross section elevation of one embodiment of a preliminary energy storage structure, e.g. a microbattery, after being diced.
Figure 5A:
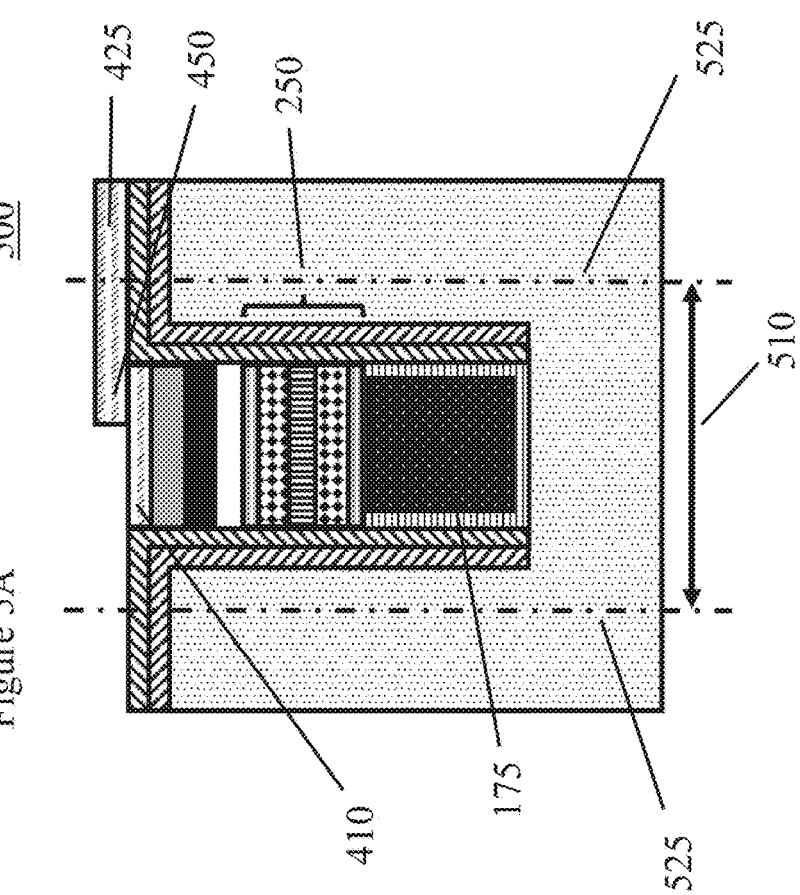
FIG. 5A is a cross section elevation of a preliminary energy storage structure embodiment shown in FIG. 4 being prepared for dicing from a wafer.

FIG. 5A is a cross section elevation of a preliminary energy storage structure embodiment 500 shown in FIG. 4 after being prepared for dicing (singulation) from a wafer.

The dicing lines 525 define how and where the energy storage structure 500 will be cut from a substrate and/or wafer to form the microbattery structure 550 shown in FIG. 5B.

FIG. 5B is a cross section elevation of one embodiment of a preliminary energy storage structure, e.g. a microbattery, 550 after being diced or singulated 530.

The dicing 530 is done by know techniques like sawing, scribe-and-cleaving, laser cutting, and water pressure.

The dicing lines 525 define the location of the cutting/dicing and width of the cut 510. The width of the cut 510 determines the width 560 of the microbattery 550. In some embodiments, the microbattery 550 has a width 560 about 1 millimeter (mm). However, these microbatteries 550 are scalable and larger or smaller widths 560 are envisioned. In some embodiments, the microbattery 550 width 560 can be from 0.5 to >10 mm. Factors that constrain the microbattery 550 width 560 include the width of the trench 150 and the surface area available where the microbattery 550 will be used.

Figures 6A, 6B:
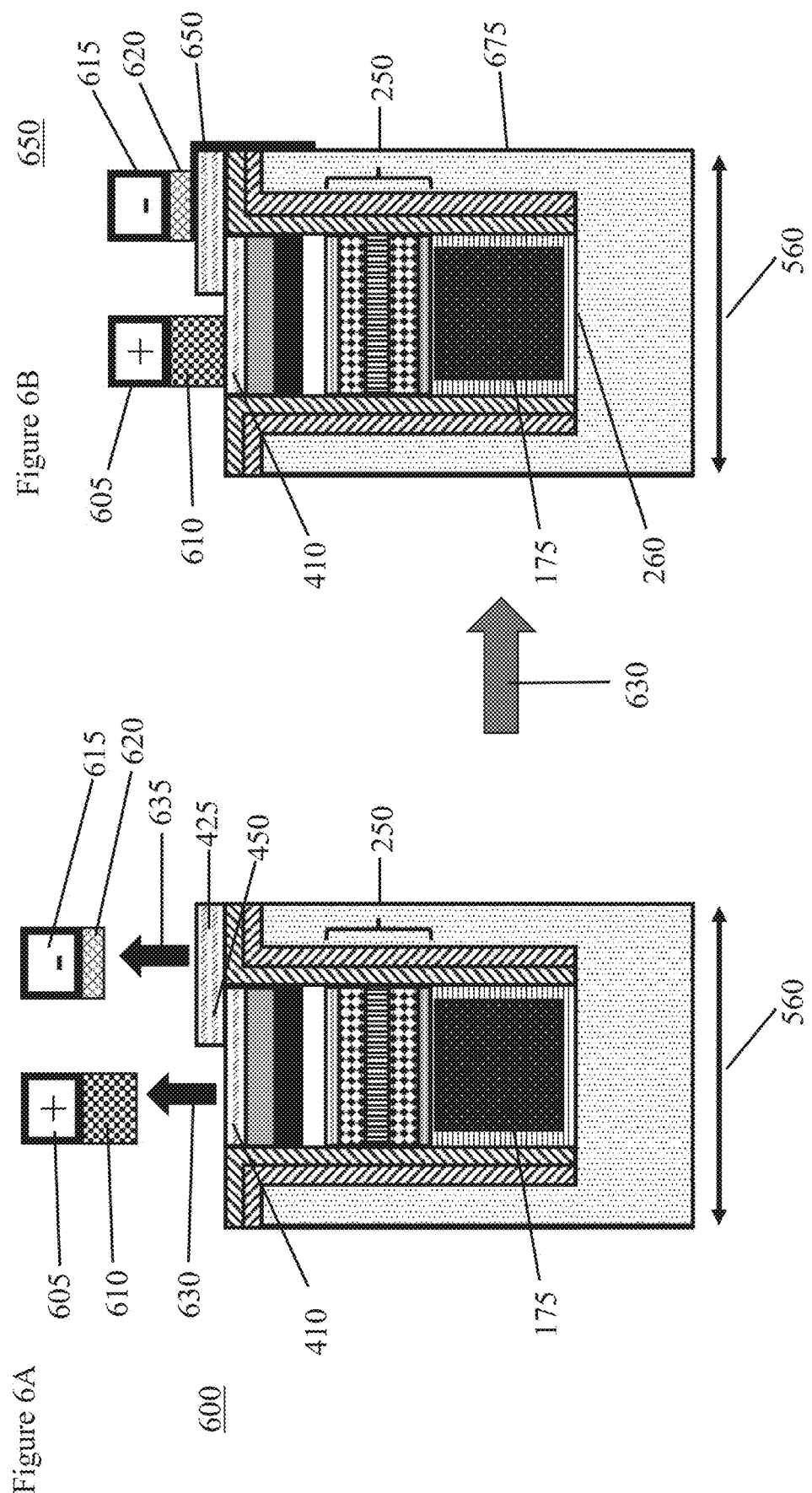
FIG. 6A is a cross section elevation of one embodiment of a microbattery being prepared for contact attachment.
FIG. 6B is a cross section elevation of one embodiment of a microbattery with contacts attached.

FIG. 6A is a cross section elevation of one embodiment of a microbattery 600 being prepared for contact attachment.

A positive contact 605 has a surface coated with a conductive adhesive material 610, e.g. silver (Ag) epoxy 610. Either the structure 550 is moved 630 toward the conductive epoxy 610 and/or the positive contact 605 and conductive epoxy 610 move 630 toward the structure 550. The conductive epoxy 610 electrically and physically connects the positive contact 605 to the cathode 350 through the conductive sealing layer 410 and cathode conductive cap layer 375.

In like manner and in some embodiments, a negative contact 615 has a surface coated with a conductive epoxy 620, e.g. a silver (Ag) epoxy. A wire bond 650 (shown in FIG. 6B) is attached to insulating layer 425 and between the conductive epoxy 620 and insulating layer 425 so a physical and electrical contact is made from the negative contact 615 through the epoxy 620 to the wire bond 650. Either the structure 550 is moved 635 toward the epoxy 620 and/or the negative contact 615 and epoxy 620 moves 635 toward the structure 550. The wire bond 650 electrically connects to the negative connection 675 of the microbattery 650.

In alternative embodiments, the negative connection 675 made to the microbattery 650 is made through the sidewall 110/substrate 160 and no negative contact 615, negative contact epoxy 620, wire bond 650, nor insulating layer 425 is used.

FIG. 6B is a cross section elevation of one embodiment of a completed microbattery 650 embodiment with positive 605 and negative 615 contacts attached. Note that the wire bond 650 connects the negative contact 615 through the sidewall 110/substrate 160 side 675 and the active surface 260 to the anode 175.

In other embodiments, the epoxy 620 can be non-conductive and the negative contact 615 is electrically connected 650 directly to or disposed directly on the substrate 160 side 675 or structure 650 bottom.

Figure 7:
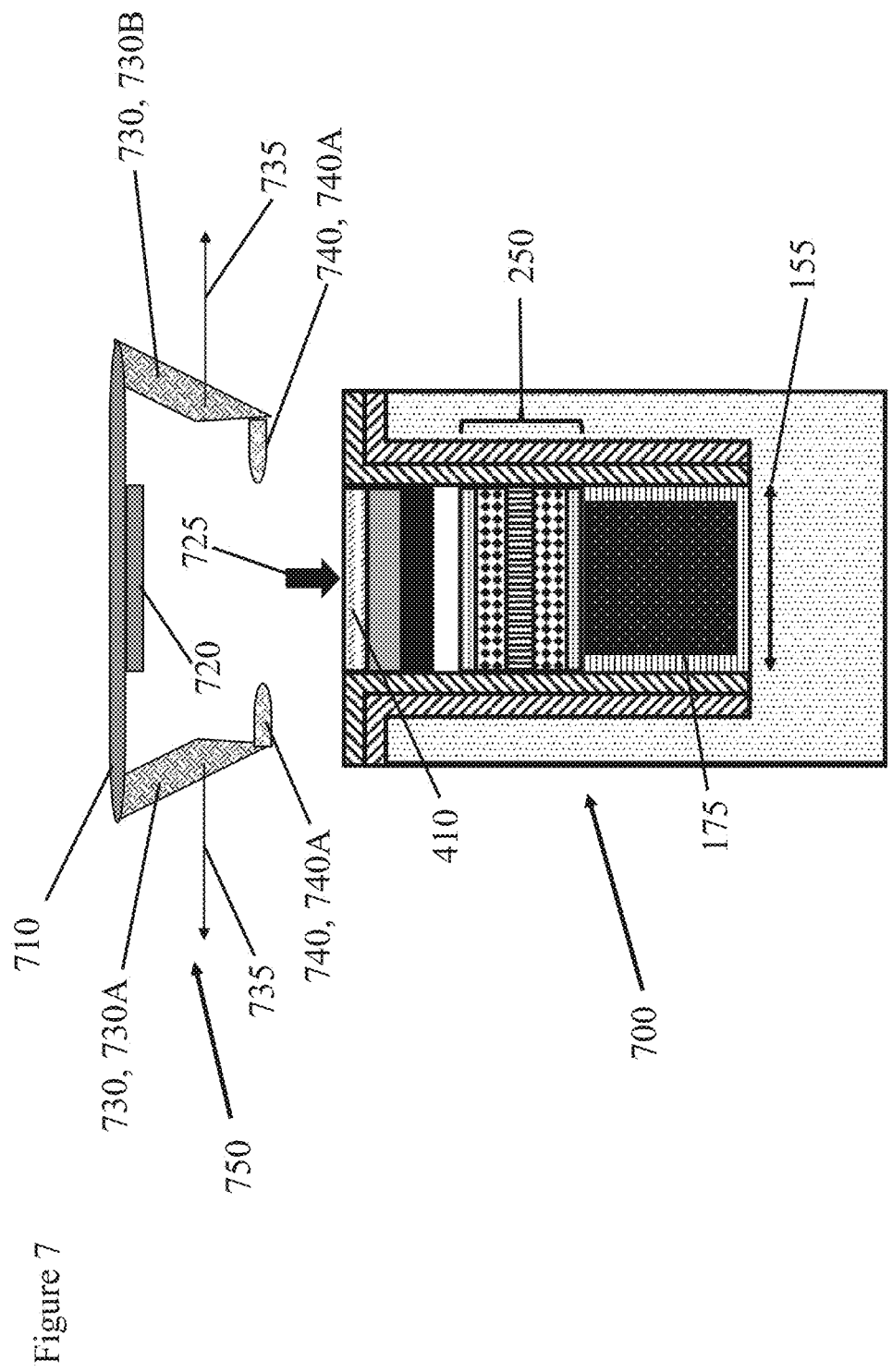
FIG. 7 is a cross section elevation of an alternative embodiment of a preliminary energy storage structure in preparation for installation of a pressure maintaining and conductively patterned tension clamp.

FIG. 7 is a cross section elevation of an alternative embodiment of a preliminary energy storage structure 700 in preparation for installation of a pressure maintaining tension clamp 750.

Note that in this embodiment starts with the structure 400 in FIG. 4 without the deposition of the insulating layer 425. Contacts are not yet formed on the structure.

The pressure maintaining tension clamp 750 or tension clamp 750 is made of a top plate 710. The top plate 710 has an arm 730 rotationally attached to each side of the top plate

710. A left arm 730A attaches to the left side of the top plate 710 at a pivot point that allows the left arm 730A to rotate or swing 735 outward, away from the center of the top plate 710. In like manner, a right arm 730B attaches to the right side of the top plate 710 at a pivot point that allows the right arm 730B to rotate or swing 735 outward, away from the center of the top plate 710. At the opposite end (from the pivot) of each of the arms 730 a catch 740 is attached. The left catch 740A attaches to the end of the left arm 730A and the right catch 740B attached to the end of the right arm 730B.

Note that the length of the arms 730 in FIG. 7 are shortened for clarity purposes.

In some embodiments, a pressure plate 720 is attached to the bottom surface of the top plate 710. In some embodiments, the pressure plate 720 is centered over the active area 125 and has a width (and depth) equal to the width 155 (and depth) of the active surface 260 and active region 125.

As the tension clamp 750 approaches 725 the preliminary energy storage structure 700 (and/or visa versa), the arms 730 contact the top/sides of the energy storage structure 700 and are forced to swing 735 open and slide down the sides of the energy storage structure 700 until the pressure plate 720 makes contact with the sealing layer 410.

The length of the arms 730 is chosen so that catches 740 catch the bottom of the energy storage structure 700, clamping the tension clamp 750 in place around the energy storage structure 700 so that the pressure plate 720 maintains pressure on the sealing layer 410 and thus contains the sealing layer 410 and other components within the active area 125.

The tension clamp 750 is conductive on the top contact area 720 (e.g., stainless steel, aluminum, nickel, copper, etc.). The clamp is non-conductive on the sidewall-touching arms 730 (e.g., non-conductive plastic/polymer, electrically insulated metal structure, etc.). In some embodiments, the catches 740 which contact the bottom of the microbattery 700 are electrically conductive (e.g., stainless steel, aluminum, nickel, copper, etc.). The clamp itself contains hinges which enable a tension type force so that the clamp structure's least energetic conformation is like that drawn in FIG. 7. A microbattery 700 inserted into the clamp structure produces a force against the tension hinges to open the clamp. Then the clamp clamps the microbattery with force (e.g. a compressive force), once the microbattery is fully inserted into the structure.

Figure 8:
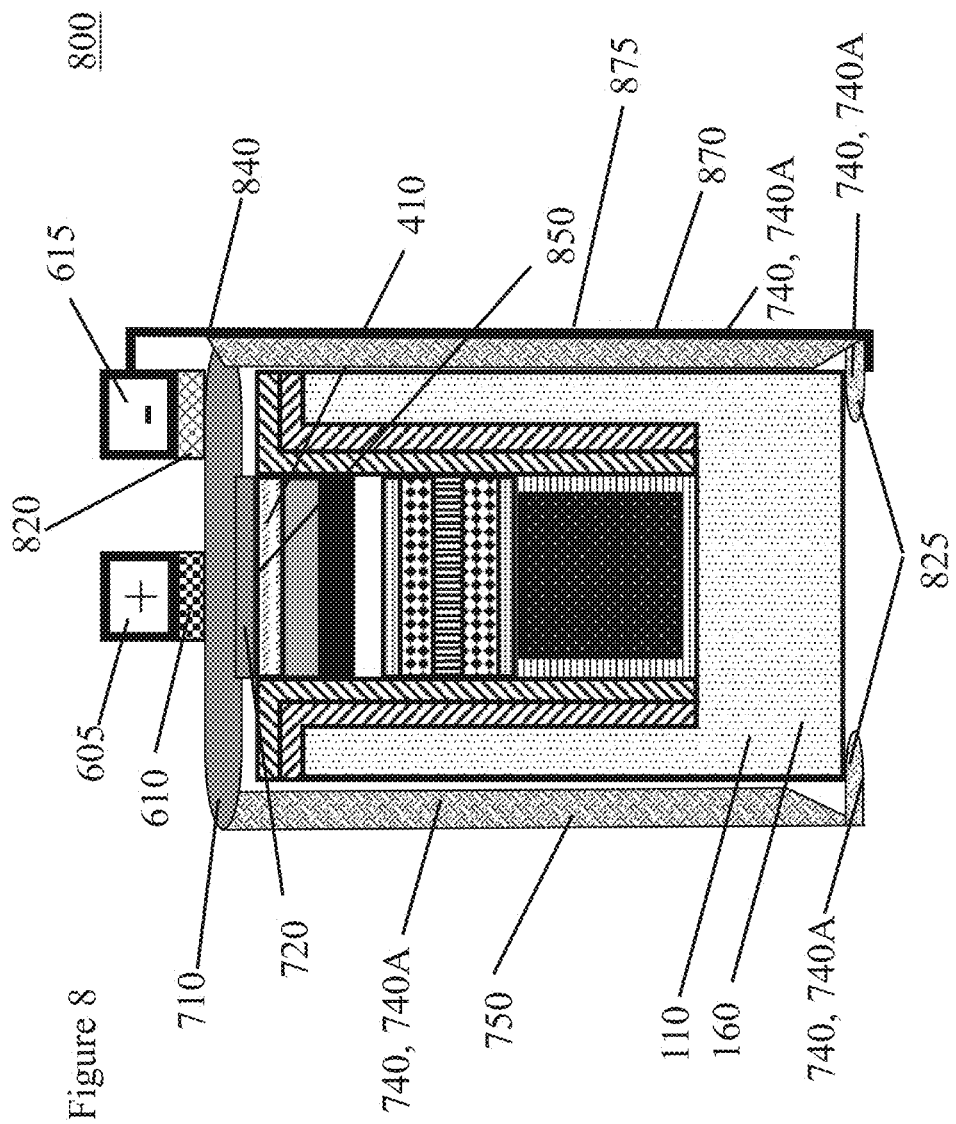
FIG. 8 is a cross section of an elevation of an alternative embodiment of an energy storage structure, e.g. microbattery, with final contacts attached to the installed pressure maintaining and conductively patterned tension clamp.

FIG. 8 is a cross section of an elevation of an alternative embodiment of an energy storage structure, e.g. microbattery, 800 with final contacts attached to the installed pressure maintaining tension clamp 750.

The left 740A and right 740B catches 740 are engaging 825 the bottom of the structure 800 to put tension on the left 730A and right 740B arms 740, respectively. The tension in the arms 740 creates a downward force through the top plate 710 and pressure plate 720 on the sealing layer 410 and also puts the pressure plate 720 and top plate 710 in electrical contact with the sealing layer 410 and therefore with the cathode structure and the rest of the internal components in the active region 125 under a compressive force.

In some embodiments, a positive contact 605 is mechanically and electrically connected to the top plate 710 through an electrically conductive epoxy 610, e.g. silver (Ag) epoxy 610. A negative contact 615 is mechanically connected to the top plate 710 with a non-conductive epoxy 820 but not electrically connected to the top plate 710.

In one embodiment, the wire bond 840 is electrically insulated from the pressure plate 720 and top plate 710, e.g. the top plate does not extend to touch the wire bond 840. Further, the arms 730 are non-conductive (or the microbattery sides 870 are insulated) and do not electrically connect to the side 870 of the microbattery. In this embodiment, the catches 740 are conductive and in electrical and physical contact 825 with the bottom of the structure 800 and therefore in electrical contact through the substrate 160 to the anode 175. In this case, the wire bond 840 extends and electrically connects to the catches 740.

In alternative embodiments, the negative contact 615 is physically and electrically connected to the bottom of the microbattery 800 or to one or more of the catches 740. In this embodiment, the positive contact 605 is on the top and the negative contact 615 is on the bottom of the structure 800. In this embodiment, the microbattery 800 can integrate with a device by insertion into a forked-like contact structure, where one fork is a positive connection and the other fork is a negative connection-similar to current standard contact battery holders.

Figure 8A:
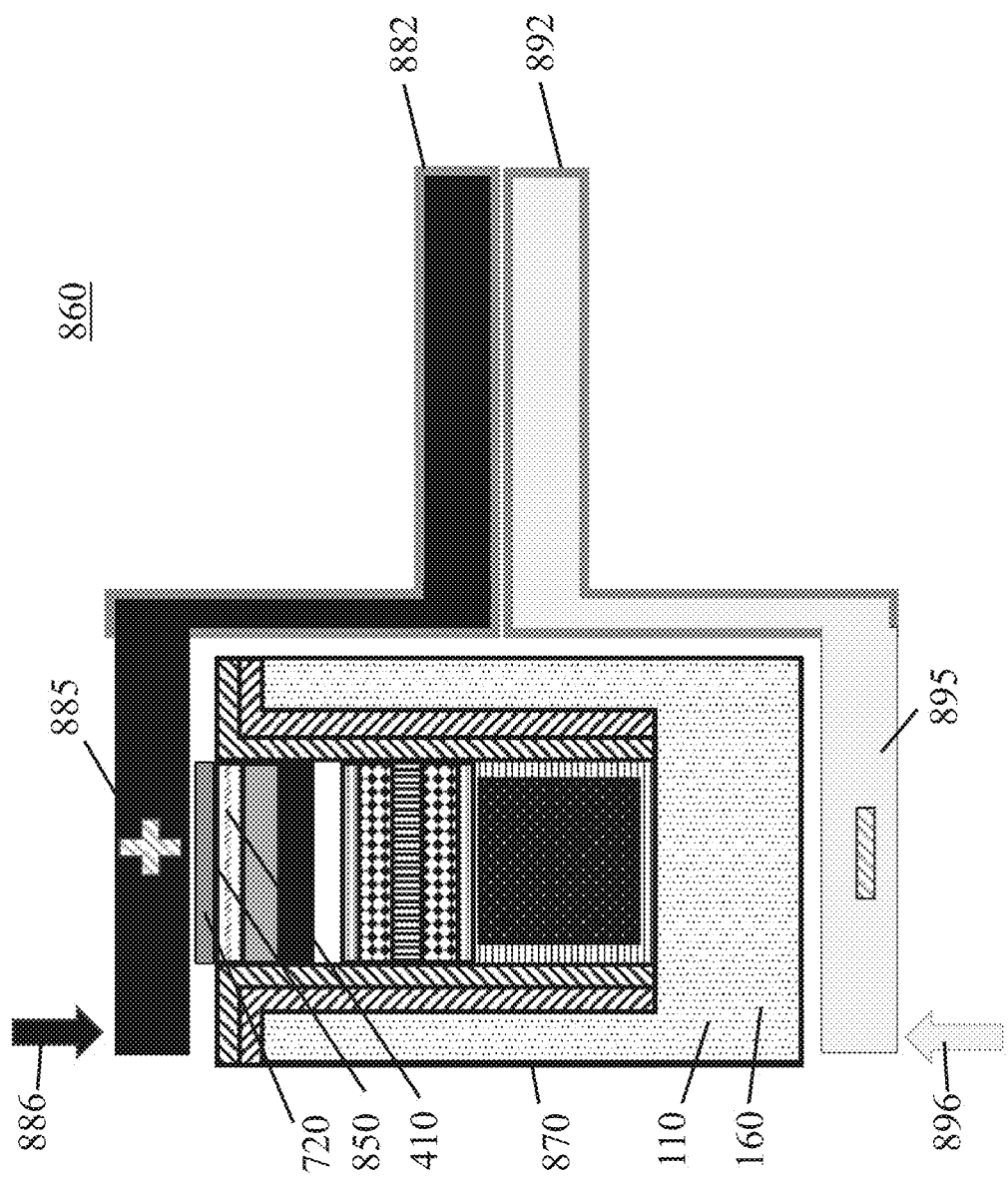
FIG. 8A is a cross section of an elevation of an alternative embodiment of an energy storage structure, e.g. microbattery, with external contacts providing compression to the microbattery internals.

FIG. 8A is a cross section of an elevation of an alternative embodiment of an energy storage structure, e.g. microbattery, with external contacts providing compression to the microbattery internals.

In this embodiment, a positive contact 885 and a negative contact 895 have a gap between them which is smaller the microbattery. The microbattery fits into the positive 885 and negative 895 contacts and the contacts (885, 895) apply a compressive force (886, 896) on the microbattery. The compressive force causes the positive contact 885 to physically and electrically connect to the pressure plate 720 (which in some embodiments sits proud of the trench 150) and is in turn electrically connected to the cathode, e.g. 310. The compressive force causes the negative contact 895 to physically and electrically connect to the anode 175 through the side/bottom 870 and substrate 160. The positive 885 and negative 895 contacts are electrically insulated (882 and 892, respectively) in some locations to avoid short circuiting.

FIG. 9A is a cross section elevation of another alternative embodiment of a preliminary energy storage structure 900 with an electrolyte layer 250 placed in the active region 125 and with notches (925A, 925B) created in the sides of the active region 125 above the electrolyte layer 250. In some embodiments, the notches (in general 925) are positioned above the electrolyte 250 in the sidewalls all around the active region 125.

In some embodiments, the structure 900 begins with the structure 200 shown in FIG. 2.

The notches 925 are formed as a discrete step during the trench formation. The timing of this step dictates the magnitude and location of the notches (925). First, a dry plasma etch using SF6/C4F8 cyclic chemistry is used to form the top of the trench using dry plasma etch techniques, creating a trench with a depth equal to the desired location of the notch. Next, a dry plasma etch process using SF6/O2 non-cyclic chemistry is used to create the notch. Last, we return to the original etch process (SF6/C4F8 cyclic) to complete the trench (150) etch to its final desired depth while maintaining original verticality of the first etch and simultaneously leaving the notch 925 at the top of the substrate 160.

FIG. 9B is a micrograph image 950 of a notch 935 in the sidewalls of the active region 125. In this embodiment, the notch 935 has a notch depth of about 19.55 micrometers (um) and a notch height of about 9.5 um.

FIG. 9C is a cross section elevation of a cathode structure cup 990.

The cathode structure cup 990 formed by one or more cup sides 976 and a cup top 975. The cathode structure cup 990 has an internal side 995 (containment side 995) that contains a cathode structure 310 and has an external side 996. In some embodiments, the cathode structure 310 includes one or more of the cathode structure 310 layers, e.g. the dielectric separator 325, the cathode/electrode 350, and the conductive cap 375. One or more feet 960 (e.g. a left foot 960A and a right foot 960B or a single foot surrounding the cup opening) protrude on the external side 996 away from the internal side 995.

While the feet 960 are shown at the bottom of the external side 996, the feet 960 can be anywhere along the external side 996 depending on the location of the notches 935, how far the dielectric separator 325 needs to be inserted into the active region 125, how far the cup top is to sit proud (even, or recessed) of the surface, etc.

Figure 10:
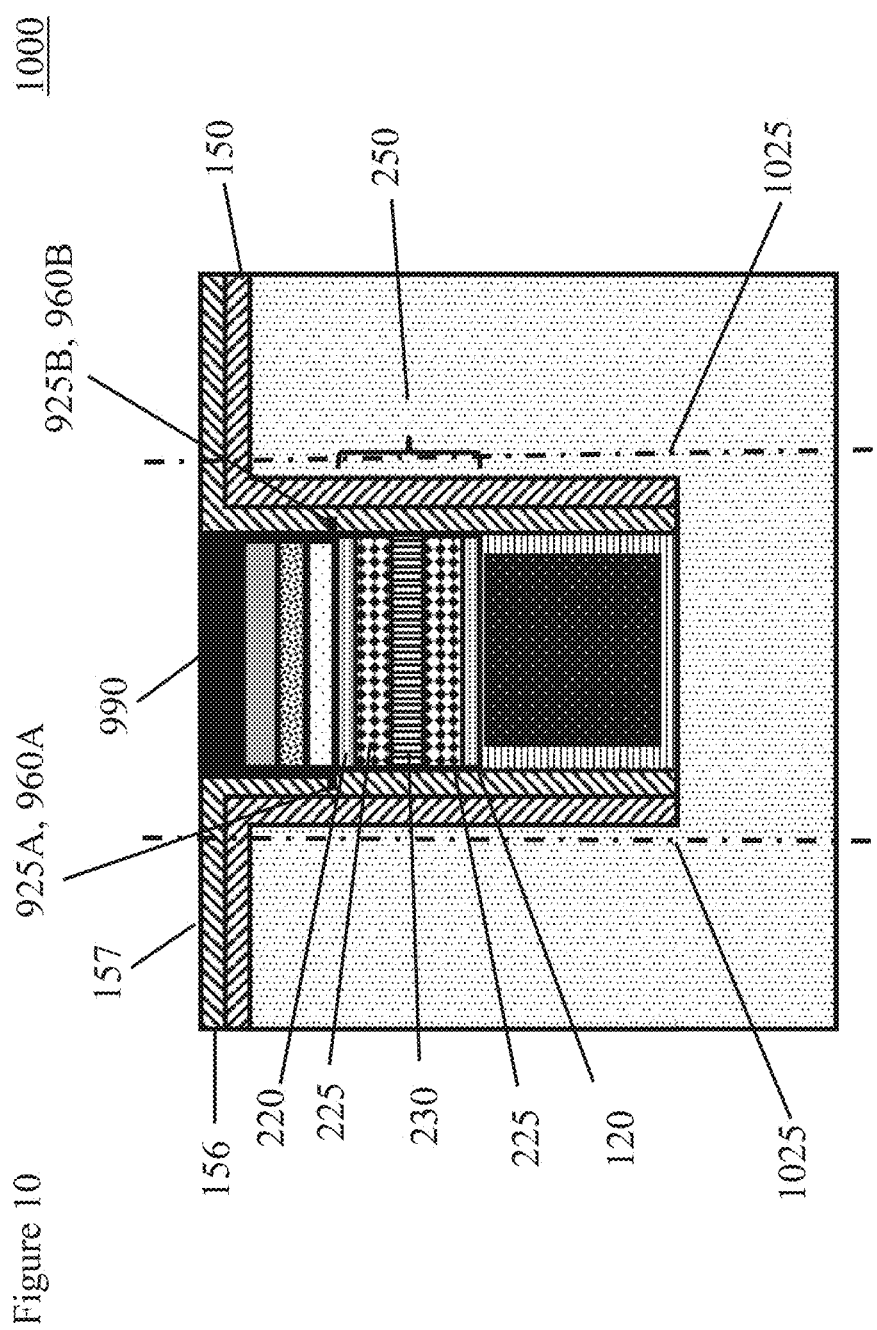
FIG. 10 is a cross section elevation of the alternative embodiment of a preliminary energy storage structure shown in FIG. 9A with the cathode structure cup in place in the active region, prepared for dicing from a wafer.

FIG. 10 is a cross section elevation of the alternative embodiment of a preliminary energy storage structure 900 shown in FIG. 9A with the cathode structure cup 990 in place in the active region 125. Dicing lines 1025 show where the structure 1000 will be diced/singulated from a wafer/substrate.

In this embodiment, the cathode structure cup 990 is positioned over the active region 125 and a force is applied to force the cathode structure cup 990 into the active region 125 until the feet 960 interlock into the notches (925A, 925B). The cathode 310 faces and interfaces the electrolyte 250.

Once the feet 960 interlock in the notches 925, the cathode structure cup 990 retains the internal components of the active region 125 in place and creates a seal of the active region 125. The cathode 310 is in electrical and physical contact with the electrolyte.

In some embodiments, the top 975 is made so the top surface of the top 975 is coplanar with the top 157 of the structure. In other embodiments, a CMP is performed.

Figure 11:
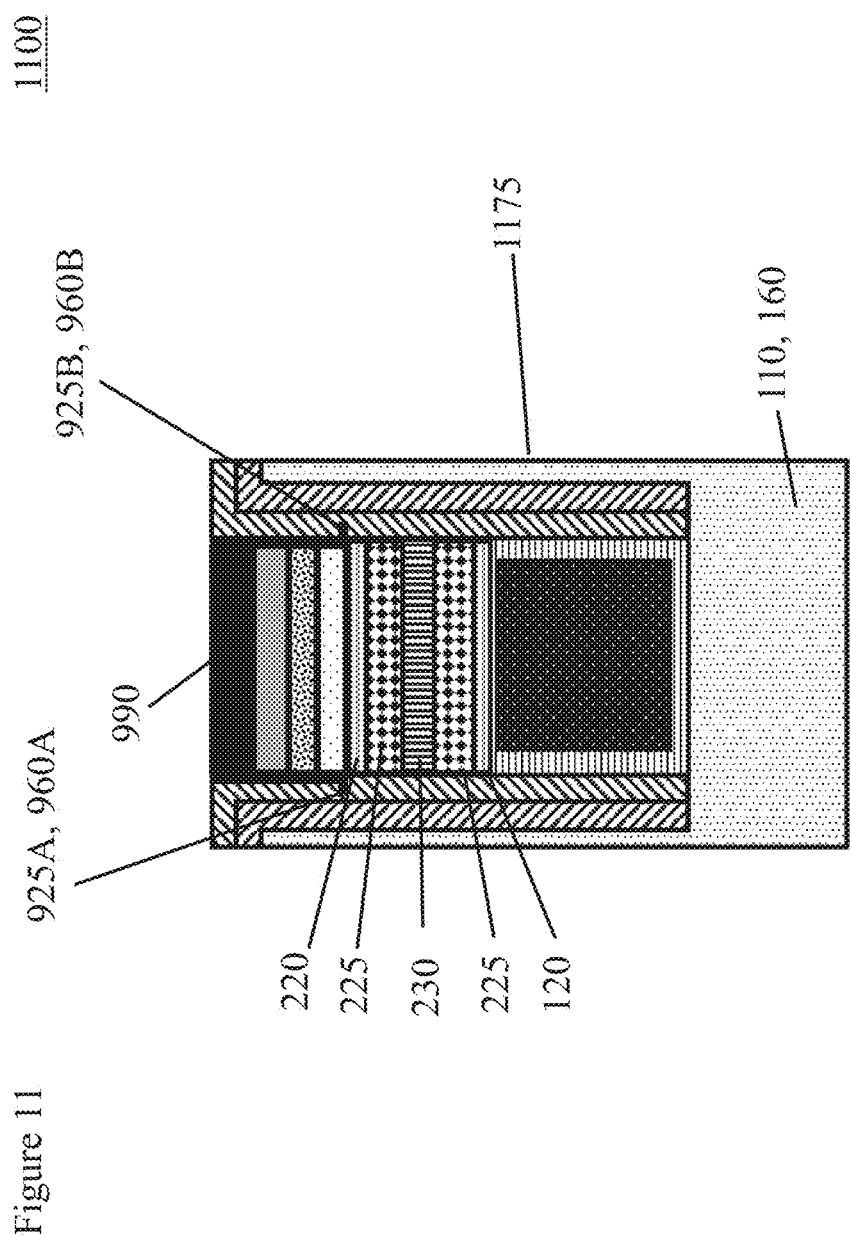
FIG. 11 is a cross section elevation of a completed alternative embodiment of a preliminary energy storage structure, e.g. microbattery.

FIG. 11 is a cross section elevation of a completed, singulated, alternative embodiment 1100 of an energy storage structure, e.g. microbattery 1100. In this embodiment, the cathode connection is made through the top 975 of the cathode structure cup 990. In this embodiment, the connection 1175 to the anode 175 is made through the side wall 110/substrate 160.

Figure 12:
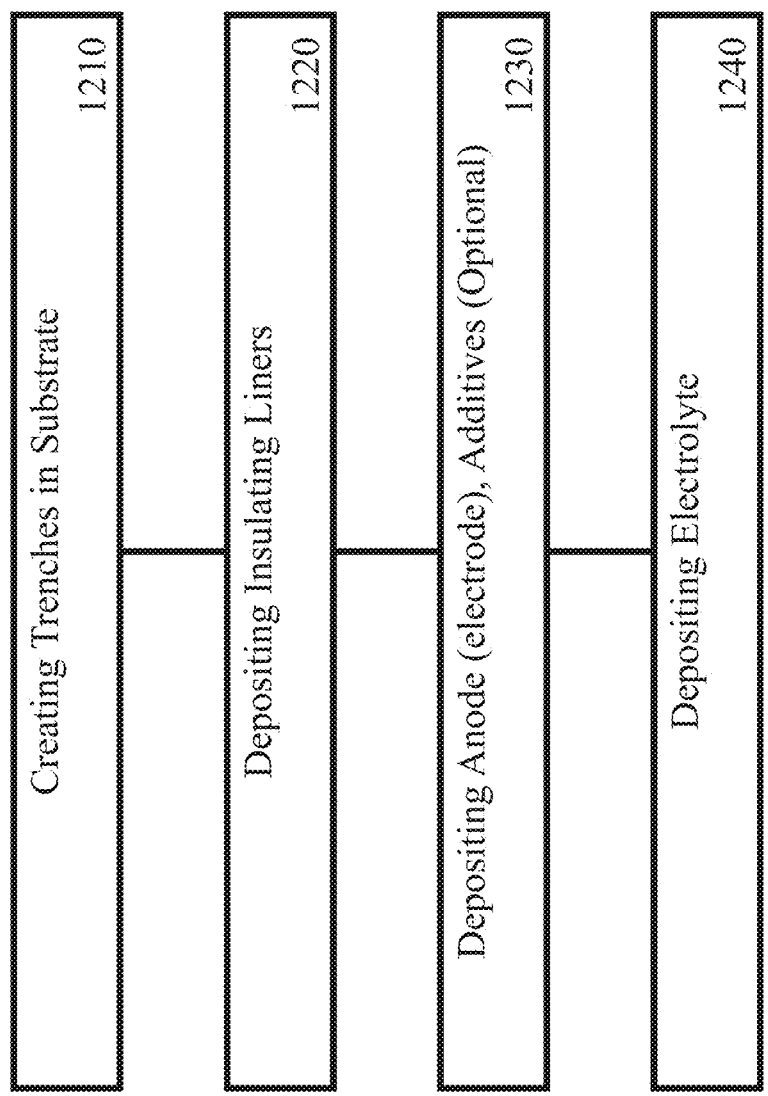
FIG. 12 is a flow chart of a method with preliminary steps of making an in situ energy storage device with all internals sealed within an active region.

FIG. 12 is a flow chart of a method 1200 with preliminary steps of making an in sit energy storage device with all internals sealed within an active region 125.

The method begins with creating 1210 one or more trenches 150 in a substrate 160. In some embodiments each of the trenches 150 has four trench sidewalls 110 and a trench bottom 170. Other trench 150 shapes are envisioned, including trenches with circular or rounded sidewalls 110.

Step 1220 deposits one or more electrically insulating liners (154, 156) on the trench sidewalls 110 and removing any of the insulating liners (154, 156) from the trench bottom 170.

Step 1230 deposits an anode 175 in the trench 150, more specifically in the active region 125. The anode 175 is in physical and electrical contact with the trench bottom 170. In this fashion the bottom of the trench becomes incorporated with the anode or becomes a portion of the active anode itself (e.g., when the trench bottom is Silicon). Optionally, additives can be added.

Step 1240 deposits an electrolyte 250 in the trench 150/active region 125 on the anode 175.

It shall be noted that a similarly functioning structure can be created by stacking the components in the opposite fashion so that the anode 175 is on the top of the trench 150 and the cathode 310 is on the trench 150 bottom 260. Sealing and connection features of this invention can be used in either configuration. In this embodiment, step 1230 would deposit the cathode 310.

Alternative methods are completed in alternative ways, as described below.

Figure 13:
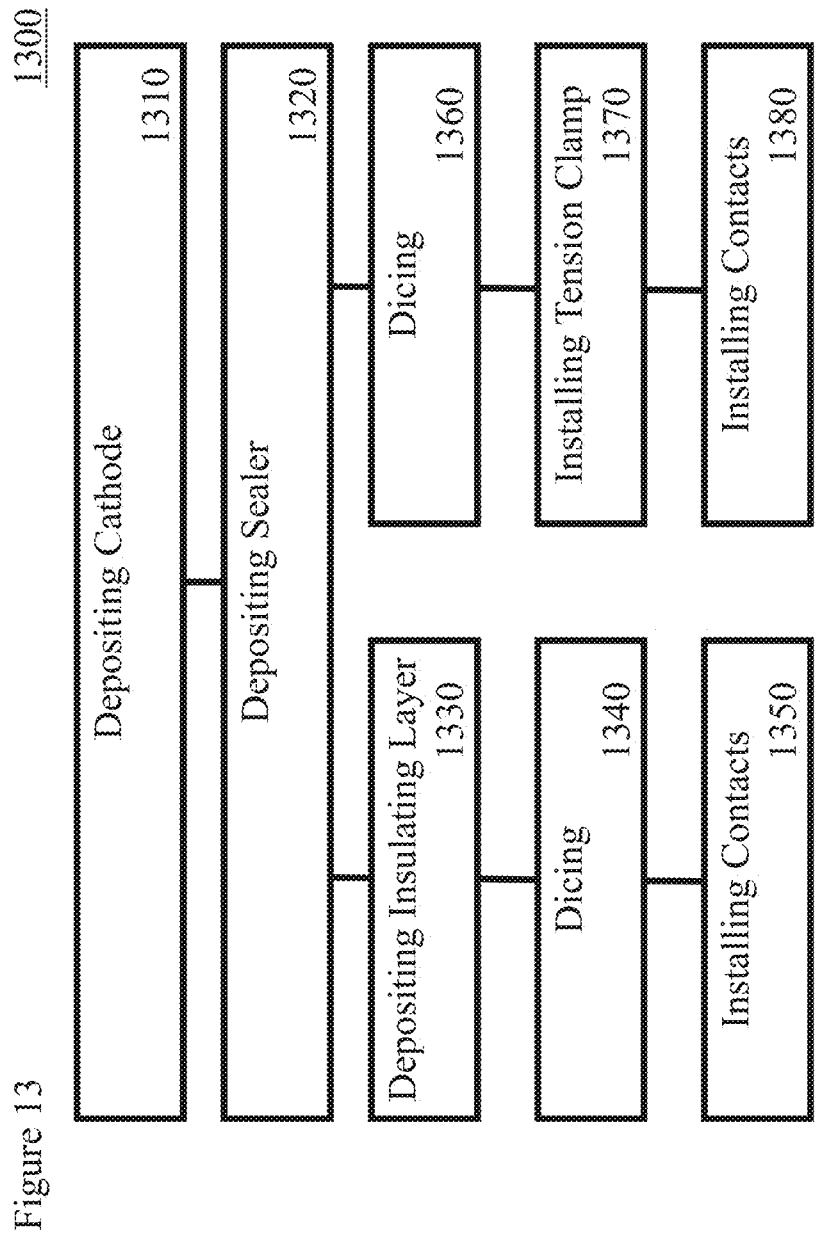
FIG. 13 is a flow chart of two alternative methods of making an in situ energy storage device with all internals sealed within an active region.

FIG. 13 is a flow chart of two alternative methods 1300 of making two different in situ energy storage device with all internals sealed within an active region 125, e.g. device 650 and device 800.

After step 1240 is completed, step 1310 deposits a cathode 310 in the trench 150/active region 120 on the electrolyte 250 as described above. (In alternative embodiments, where the components are deposited in opposite order, this step 1210 would deposit the anode 175).

Step 1320 deposits the sealer in the trench 150/active region 125 on the cathode 310.

In some embodiments there now is an energy storage structure formed where the anode, the electrolyte, the cathode, and the sealer are disposed within the trench 150/active region 125. The anode, electrolyte, and the cathode are contained in the trench by the trench sidewalls 110, the trench bottom 170, and the sealer/sealing layer 410.

The invention enables containment of all the components of the energy storage device/battery within the trench 150/active region 125 with only one surface being sealed by the sealer/sealing layer 410. This permits a well contained three-dimensional structure with less leakage. The structure has materials deposited and is cured, singulated, and galvanically cycled using standard manufacturing methods.

In a first embodiment 650, the process 1300 proceeds to step 1330 where the insulating layer 425 is deposited to partially cover the sealer/sealing layer 410 as described in the description of FIG. 4.

Step 1340 dices the structure 500 as described in the description of FIGS. 5A and 5B.

Step 1350 attaches the positive 605 and negative 615 contacts as described in the description of FIGS. 6A and 6B.

Note that steps 1340 and 1350 can be performed in reverse order.

For an alternative embodiment 800, step 1360 is performed after step 1330.

Step 1360 dices the structure 500 without depositing the insulation layer 425.

Step 1370 installs the tension clamp 750 as described in the description of FIGS. 7 and 8.

Step 1380 installs the contacts as described in the description of FIG. 8.

Figure 14:
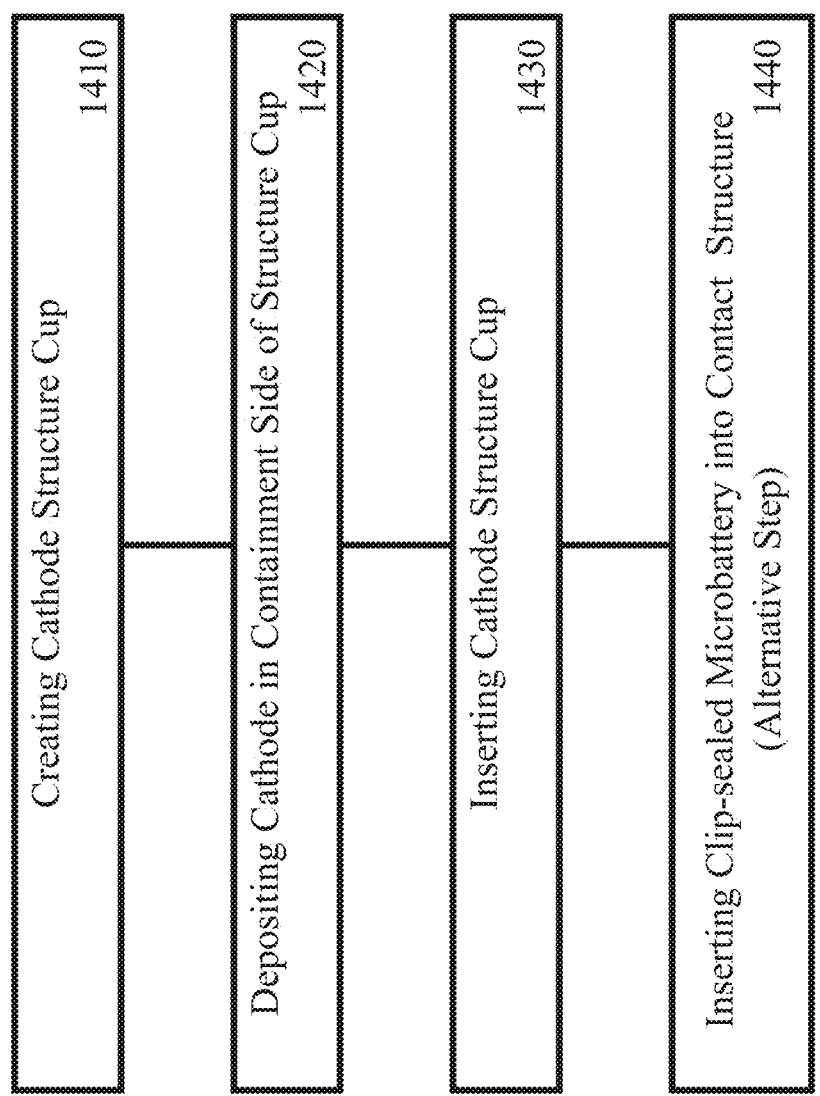
FIG. 14 is a flow chart of other alternative methods of making an ii situ energy storage device with all internals sealed within an active region.

FIG. 14 is a flow chart of another alternative method 1400 of making an in situ energy storage device 1100 with all internals sealed within an active region.

After step 1240 deposits an electrolyte 250, step 1410 is performed.

Note that prior to the anode 175 and electrolyte 250 being deposited, the notches 925 where created in the sidewalls 110 of the trench 150.

Step 1410 creates the cathode structure cup 990 with a containment side 995 where the cathode 310 is contained and an outside side 996 where one or more of the feet 960 are protruding.

Step 1420 deposits the cathode 310 in the containment side 995.

Step 1430 inserts the cathode structure cup 990 containing the cathode 310 into the trench 150/active region 125, inserting the feet 960 into one or more notches 925 in trench sidewalls 110 to contain the cathode 310 in the trench 150/active region 125 and in electrical and physical contact with the electrolyte 250.

Step 1440 is an alternative to step 1430 where the cathode 310 is inserted into the trench and held in place along with the other components by the positive contact 885 and a negative contact 895 connections described in FIG. 8A.

Note that the device can be diced from the substrate before or after the cathode structure cup 990 is inserted into the trench 150/active region 125.

The various embodiments of the present invention enable a full three-dimensional energy storage device, e.g. battery, that is entirely encapsulated within a substrate 160. In some typical embodiments, the substrate 160 is used for mechanical reinforcement and containment of all the active components (anode, electrolyte, and cathode) of the device. These components are not layered on a substrate as in the prior art where materials and thicknesses are limited to thin film type devices. These devices have thicker materials that enable more device energy capacity.

The device components can be applied in thicker layers in multiple steps and applications while still being contained within the trench 150/active region 125. Materials like slurries and techniques like doctor blading can be used to apply layer upon layer of the device components within the trenches 150/active region 125. The trench 150/active area 125 contains the materials and only the trench opening has to be sealed to entirely seal all the device components hermetically within the trench 150/active region 125.

Using the various capping/sealing methods presented, containment and pressure placed on the components can be controlled during the curing and galvanic cycling of the devices. The internal components are contained under repeatable and precise pressures while undergoing these processes.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A lithium energy storage device comprising:
   a substrate with one or more trenches, each trench having a trench bottom and one or more trench sidewalls;
   one or more electrically insulating liners disposed on the trench sidewalls but not on the trench bottom;
   an anode disposed in the trench, the anode being in physical and electrical contact with the trench bottom;
   an electrolyte disposed on the anode;
   a cathode disposed on the electrolyte;
   a sealer disposed on the cathode, the sealer sealing the trench, the sealer being electrically, conductive and in electrical contact with the cathode,
   wherein the anode, the electrolyte, the cathode, and the sealer are disposed and entirely contained within the trench.

2. An energy storage device, as in claim 1, further comprising an external contact electrically and physically connected to the sealer.

3. An energy storage device, as in claim 1, further comprising:
   an insulating layer partially disposed on the sealer, the insulating layer electrically, insulating part of the sealer;
   a negative connection; and
   a negative contact physically attached to the insulating layer and physically and electrically connected to the negative connection,
   wherein the negative connection is electrically connected to the anode through the substrate.

4. An energy storage device, as in claim 1, where the sealer is made of one or more of the following: a conductive epoxy, a conductive polymer, and silver (Ag) epoxy.

5. An energy storage device, as in claim 1, further comprising a tension clamp, the tension clamp putting pressure on the sealer, the tension clamp having a tension clamp top plate, the tension clamp top plate being in electrical contact with the sealer.

6. An energy storage device, as in claim 5, further comprising:
   a positive contact electrically and physically connected to the tension clamp top plate;
   a negative contact physically connected but not electrically connected to the tension clamp top plate; and
   a negative connection electrically connecting the negative contact to the anode through the substrate.

7. An energy storage device, as in claim 5, where the tension clamp comprises:
   the tension clamp top plate;
   a pressure plate attached to a side of the tension clamp, the top plate between the tension clamp top plate and the seal, the pressure plate being electrically conductive and the seal electrically connected to the tension clamp top plate through the pressure plate;
   a first and second arm, an upper end of each of the first and second arm rotationally connected to a first and second side of the tension clamp top plate respectively;
   a first catch rotationally connected to a lower end of the first arm and a second catch rotationally connected to a lower end of the second arm,
   wherein the first and second catch hook on to the bottom of the substrate causing a force acting through the tension clamp top plate to push the pressure plate on the seal compressing the seal, cathode, electrolyte, and anode into the trench.

8. An energy storage device, as in claim 1; further comprising:
   one or more notches in the trench sidewalls, the notches being above or approximately in the top plane of the electrolyte; and
   a cathode structure cup having cathode containment side and an outside, the outside having one or more feet,
   wherein the cathode is contained in the cathode containment side of the cathode structure cup and the feet engage into one or more of the notches so that the cathode structure cup and the cathode are within the trench and the cathode is in physical and electrical contact with the electrolyte.

9. An energy storage device, as in claim 8, where the cathode structure cup comprises:
   a top, the top being electrically conductive and the top having an inside top side facing the cathode containment side, and an outside top side facing the outside; and
   one or more cathode structure cup sides connected to the top and surrounding the cathode containment side,
   wherein the feet are connected to one or more of the cathode structure cup sides facing the outside.

10. An energy storage device, as in claim 1, where the electrolyte comprises the following three layers:
- a polymer electrolyte;
- a solid polymer electrolyte (SPE); and
- a polymer electrolyte.

11. An energy storage device, as in claim 10, where the polymer electrolyte is one or more of the following: polycaprolactone (PCl) and succinonitrile (SN) and Lithium bis(trifluoromethanesulfonyl)imide (LiTFSI).

12. An energy storage device, as in claim 10, where the solid polymer electrolyte (SPE) is one or more of the following: a polymer saturated separator material, a polymer saturated fabric-like inter-woven layer material, and polyacrylnitrile (PAN) saturated in polycaprolactone (PCl) and succinonitrile (SN) and Lithium bis(trifluoromethanesulfonyl)imide (LiTFSI).

13. A lithium energy storage device comprising:
- a substrate with one or more trenches, each trench having a trench bottom and one or more trench sidewalls;
- one or more electrically insulating liners disposed on the trench sidewalk but not on the trench bottom;
- an anode disposed in the trench, the anode being in physical and electrical contact with the trench bottom;
- an electrolyte disposed on the anode;
- a cathode disposed on the electrolyte, the cathode further comprising:
  - a dielectric separator, disposed on the electrolyte;
  - a cathode electrode disposed on the dielectric separator; and
  - a conductive cap disposed on the cathode electrode;
- a sealer disposed on the conductive cap and being in electrical and physical contact with the conductive cap, the sealer sealing the trench, the sealer being electrically conductive and in electrical contact with the cathode, wherein the anode, the electrolyte, the cathode, and the sealer are disposed within the trench forming a three-dimensional battery structure and the anode, the electrolyte, and the cathode are contained in the trench by the trench sidewalls, the trench bottom, and the sealer.

14. An energy storage device, as in claim 13, where the cathode electrode is made of one or more of the following: Lithium Manganese Oxyfluoride (LMOF), $Li_2MnO_2F$, Lithium Iron Phosphate (LFP), $LiFePO_4$, a solid polymer electrolyte (SPE) material, one or more conductive additives, and one or more binders.

15. An energy storage device, as in claim 13, where the cathode electrode is made of compound with two lithium atoms per molecule.

16. An energy storage device, as in claim 13, where the cathode electrode is made of between 55 percent and 85 percent by mass of LMOF, between 7.5 percent and 20 percent by mass of a solid polymer electrolyte (SPE), and between 5 percent and 15 percent by mass of a conductive additive.

17. An energy storage device, as in claim 16, where the conductive additive is carbon black.

18. An energy storage device, as in claim 13, where the dielectric separator is a material that prevents the flow of electrons but permits the flow of ionic current.

19. An energy storage device, as in claim 13, where the dielectric separator is one of the following: a woven fabric-like polymer material, a polymer saturated separator material, a polymer saturated fabric-like inter-woven layer material, and polyacrylnitrile (PAN) saturated in polycaprolactone (PCl) and succinonitrile (SN) and Lithium bis(trifluoromethanesulfonyl)imide (LiTFSI).

20. An energy storage device, as in claim 13, where the sealer is a conductive epoxy.

\* \* \* \* \*